(12) United States Patent
Chaieb et al.

(10) Patent No.: US 8,795,906 B2
(45) Date of Patent: Aug. 5, 2014

(54) SILICON HYDRIDE NANOCRYSTALS AS CATALYSTS FOR PROTON PRODUCTION IN WATER-ORGANIC LIQUID MIXTURES

(75) Inventors: Sahraoui Chaieb, Thuwal (SA); Christopher Holt, Roslindale, MA (US)

(73) Assignee: King Abdullah University of Science and Technology, Thuwal (SA)

( * ) Notice: Subject to any disclaimer, the term of this patent is extended or adjusted under 35 U.S.C. 154(b) by 5 days.

(21) Appl. No.: 13/404,847

(22) Filed: Feb. 24, 2012

(65) Prior Publication Data

US 2012/0219869 A1    Aug. 30, 2012

Related U.S. Application Data

(60) Provisional application No. 61/446,979, filed on Feb. 25, 2011.

(51) Int. Cl.
*H01M 8/16* (2006.01)
*H01M 8/04* (2006.01)
*H01M 8/08* (2006.01)

(52) U.S. Cl.
CPC ...... *H01M 8/04186* (2013.01); *H01M 8/04276* (2013.01); *H01M 8/08* (2013.01); *H01M 8/16* (2013.01)
USPC ........................................... 429/401; 429/400

(58) Field of Classification Search
CPC .................... H01M 8/04186; H01M 8/04276; H01M 8/08
USPC ....................................................... 429/401
See application file for complete search history.

(56) References Cited

U.S. PATENT DOCUMENTS

2004/0058217 A1*   3/2004   Ohlsen et al. .................. 429/34
2010/0255392 A1*  10/2010   Spear et al. ................... 429/421

FOREIGN PATENT DOCUMENTS

WO    WO 2007/019172    2/2007

OTHER PUBLICATIONS

Vladimir Lysenko et al., "Study of Porous Silicon Nanostructures as Hydrogen Reservoirs", The Jorunal of Physical Chemistry B, vol. 109, No. 42, Oct. 1, 2005, pp. 19711-19718.*
International Search Report and Written Opinion issued in PCT Patent Application No. PCT/US2012/026604, dated Jul. 13, 2012.
Takahagi et al., "The formation of hydrogen passivated silicon single-crystal surfaces using ultraviolet cleaning and HF etching", J. Appl. Phys., vol. 64, No. 7, pp. 3516-3521, Oct. 1, 1988.
International Preliminary Report on Patentability issued in PCT Patent Application No. PCT/US2012/026604, dated Sep. 6, 2013.
Lysenko, et al., *J Phys Chem.* 109(42):19711-8, 2005.

\* cited by examiner

*Primary Examiner* — Gary Harris
(74) *Attorney, Agent, or Firm* — Fulbright & Jaworski LLP

(57) ABSTRACT

Embodiments of the present methods may be used to produce energy in the form of an electrical current from water without the use of fossil fuel. Silicon hydride is very easy to make. This procedure in conjunction with an enzyme to produce hydrogen gas for fuel cells and other small devices. In fuel cells the production of protons may be bypassed, and an oxidant such as permanganate or oxygen from air may be used to drive the fuel cells. In such an embodiment, an intermediate reaction may not be needed to produce protons. In one embodiment, membrane-less laminar flow fuel cells with an external grid for oxygen supply from the air may be used.

5 Claims, 12 Drawing Sheets

SILICON HYDRIDE NANOCRYSTALS AS CATALYSTS FOR PROTON PRODUCTION IN WATER-ORGANIC LIQUID MIXTURES

CROSS REFERENCE TO RELATED APPLICATIONS

This application claims benefit of U.S. Provisional Application No. 61/446,979 filed on Feb. 25, 2011, which is incorporated herein by reference in its entirety.

STATEMENT REGARDING FEDERALLY SPONSORED RESEARCH

This invention was made with government support under NSF Career Award 02-38874 awarded by National Science Foundation. The government has certain rights in the invention.

TECHNICAL FIELD

The field of the invention includes at least electrochemistry, and in particular fuel cell technology. In general, the field of subject matter of the invention includes water-organic liquid mixtures. More specifically, the disclosure relates to Silicon hydride nanocrystals as catalysts for proton production in water-organic liquid mixtures.

BACKGROUND OF THE INVENTION

A fuel cell is a device that converts energy of a chemical reaction into electrical energy (electrochemical device) without combustion. A fuel cell generally comprises an anode, cathode, electrolyte, backing layers, and current collectors. Since the voltage of a typical fuel cell is usually small, they are often stacked in series. In such configurations, fuel cells can have 2-3 times greater efficiency than internal combustion engines.

There are several types of fuel cells, which are typically classified by their various electrolytes. One common type of fuel cell is a Proton Exchange Membrane (PEM) fuel cell. PEM fuel cells generally involve a solid organic polymer (e.g., polyperfluoro-sulfonic acid or NAFION®) as an electrolyte. They have high power density and can vary output quickly, which makes them desirable for portable and auto applications. PEM fuel cells are also known as polymer electrolyte fuel cells, polymer electrolyte membrane fuel cells (PEMFC), solid polymer electrolyte (SPE) fuel cells, and solid polymer membrane (SPM) fuel cells.

Fuel cells produce electricity, water, and heat using fuel and oxygen. The oxidation and reduction reactions occurring within a fuel cell are:

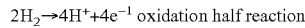

$2H_2 \rightarrow 4H^+ + 4e^{-1}$ oxidation half reaction

$4H^+ + 4e^{-1} + O_2 \rightarrow 2H_2O$ reduction half reaction

This electrochemical process is a non-combustion process that does not generate airborne pollutants. Water (liquid and vapor) is the only emission when hydrogen is the fuel. Therefore, fuel cells are a clean, low emission, and highly efficient source of energy that can use abundant and/or renewable fuels.

The two half-reactions normally proceed very slowly at the low operating temperature of a fuel cell. Specifically, kinetic performance of PEM fuel cells is limited primarily by the slow rate of the $O_2$ reduction half reaction (cathode reaction), which is more than 100 times slower than the $H_2$ oxidation half reaction (anode reaction). The $O_2$ reduction half reaction is also limited by mass transfer issues. Thus, catalysts are typically used on one or both the anode and cathode to increase the rates of each half reaction. Platinum (Pt) has been the most effective noble metal catalyst to date because it is able to generate high enough rates of $O_2$ reduction at the relatively low temperatures of the PEM fuel cells.

The catalysts used to induce the desired electrochemical reactions are often incorporated at the electrode/electrolyte interface by coating a slurry of the catalyst particles onto the electrolyte surface. When hydrogen or methanol fuel feed through the anode catalyst/electrolyte interface, an electrochemical reaction occurs, generating electrons and protons (hydrogen ions). The electrons, which cannot pass through the polymer electrolyte membrane, flow from the anode to the cathode through an external circuit containing a motor or other electrical load, which consumes the power generated by the cell. The protons generated at the anode catalyst migrate through the polymer electrolyte membrane to the cathode. At the cathode catalyst interface, the protons combine with electrons and oxygen to give water.

One major challenge for fuel cell development and commercialization has been the supply of fuel to the fuel cell. While hydrogen gas is generally the most efficient fuel, the use of hydrogen gas is complicated by storage concerns. For example, in order to supply significant amounts of hydrogen gas, especially for portable fuel cells, the hydrogen gas must be stored under pressure in specialized tanks. Such pressurized containers can add weight and complexity to a fuel cell apparatus, in addition to the costs associated with purifying and compressing hydrogen gas. Another concern regarding hydrogen gas is that it can easily ignite.

A Direct Methanol Fuel Cell (DMFC) is a popular type of PEM fuel cell that uses methanol for fuel. DMFC's are the only commercially available fuel cell units today. While DMFC's solve the hydrogen storage dilemma and perform well in the field, DMFC's suffer from lower cell voltages than are available with hydrogen gas fuel, and possess inherent toxicity and flammability difficulties. Also, the use of methanol (and fossil fuels in general) as fuel fails to eliminate carbon dioxide release, and they produce small levels of by-products that can poison the fuel cell and degrade performance. Furthermore, methanol fuels usually contain $H_2SO_4$ to facilitate oxidation of methanol and to provide ionic conductivity in the catalyst. The $H_2SO_4$ penetrates the anode structure providing ionic conductivity throughout the electrode, thus allowing most of the catalyst to be utilized resulting in improved performance. The use of $H_2SO_4$ is, however, undesirable due to sulfate species adsorbing onto the electrode surface and also the corrosive nature of the acid. Moreover, significant work has been undertaken by others to develop reformers to convert a variety of fossil fuels and other alcohols to hydrogen, but the weight burden and complexity of this approach is very large and has generally been rejected for automotive and small fuel cell applications.

In another approach, hydrogen fuel is stored in the form of metal hydrides, which release hydrogen gas to the fuel cell upon hydrolysis of the metal hydride. While the storage of hydrogen in metal hydrides overcomes the carbon dioxide issue, the maximum storage efficiency obtained thus far is about 4.0 wt. %. Other disadvantages of these systems are the necessity to carry water and, . most importantly, the requisite use of expensive metal hydrides. Further, the metal hydrides are irreversibly hydrolyzed into metal hydroxides during hydrogen production. Thus, these systems require handling of metal hydroxide by-products, which are difficult, energy intensive, and costly to convert back to the original metal hydride form.

In yet another approach, Spear et al. (U.S. Patent Publication 2010/0255392) discloses compositions comprising organosilanes, polysilanes, silanes produced from silicides or siloxenes produced from silicides that can be used to generate hydrogen, which in turn can be used in (e.g. supplied to) a fuel cell or an internal combustion engine or catalyst. As discussed by Spear et al., the use of silane and silane derivatives to generate hydrogen has a number of associated problems. $SiH_4$ and polysilanes up to $Si_3H_8$ are gases at room temperature and require special handling and high pressure cylinders for storage. However, polysilanes with four or more silicon atoms have low vapor pressures and are liquids at room temperature. Although, polysilanes with seven or more silicon atoms are no longer pyrophoric and are suitable silanes for hydrogen producing fuel, their use often involves the formation of dangerous intermediates. The Spear reference provides several methods that produce intermediates that require careful handing which highlight this problem.

In light of the current difficulties with hydrogen generation and the increasing need for a clean source of energy, new hydrogen generation technology for portable and stationary fuels cells is needed. The compositions, methods, and devices disclosed herein address the aforementioned problems and other needs.

SUMMARY OF THE INVENTION

The present disclosure provides methods and materials producing an electrical current without the use of fossil fuels. In general, the present disclosure provides methods and materials for using nanocrystals of silicon hydride dissolved in water along with an enzyme to split water and produce hydrogen gas for fuel cells and/or a chemical batteries.

In alternate embodiments, the present disclosure provides methods and materials that may be used to produce electricity from water without the use of fossil fuel by reacting silicon hydride nanocrystals and an oxidant (water). In some embodiments, this method may further include using an enzyme to produce hydrogen gas for fuel cells and other small devices. In fuel cells, the production of protons may be bypassed, and in such examples, an oxidant such as permanganate or oxygen from air may be used to drive the fuel cells. In such an embodiment, an intermediate reaction may not be needed to produce protons. In one embodiment, membraneless laminar flow fuel cells with an external grid for oxygen supply from the air may be used.

Also, the present disclosure provides methods and materials to dissolve nanocrystals of silicon hydride in water. Nanocrystals of silicon hydride are typically not soluble in water. They are generally soluble in various organic solvents where they fluoresce blue if they are 1 nm in size. In some embodiments, the silicon hydride nanocrystals are between 0.5 nm and 2.5 nm in size. In some examples, nanocrystals of silicon hydride are soluble in organic solvents that may include, but are not limited to methanol, isopropyl alcohol, tetrahydrofuran (THF), diethyl ether (Ether) and Acetonitrile. The present disclosure provides a method to make the nanoparticles soluble in water that include the step of placing the nanoparticles in alcohol. After placing the nanoparticle in alcohol, the method includes mixing the nanoparticles/alcohol solution. This step is following by adding the mixed nanoparticle/alcohol solution to water at various concentrations. In some embodiments, the concentration of the silicon hydride NCs in alcohol is about 0.2 mg/ml. In certain embodiments, the nanoparticles may continue to fluoresce under such conditions. In one embodiment, more protons may be in the water by adding more silicon hydride nanocrystals. In certain embodiments, the nanocrystals may be helping water molecules to split. This is evidenced by the fact that THF, Ether and acetonitrile for example do not donate any protons. This is the first step in splitting water without an external energy source but with only entropy of mixing that is transformed into energy that produces protons.

In one embodiment, water molecules may be split by a catalytic action of silicon hydride nanocrystals.

In some embodiments, the methods for splitting water molecules include producing protons and by incorporating an enzyme like [Fe]Hydrogenase to produce Hydrogen without using fossil fuel. These mixtures may be incorporated in existing fuel cells that rely on proton productions from acids to produce energy in the form of electricity (see laminar flow fuel cells). In further embodiments, the process may also be used to purify water. If water becomes acidic at these very low concentrations of organic solvents and nanocrystals, the embodiments of the method may used to kill bacteria and organisms that are sensitive to pH.

In some embodiments, the present disclosure provides a method for generating an electrical current by reacting silicon hydride nanocrystals with water. In some examples, the step of reacting silicon hydride nanocrystals with water takes place in a fuel cell.

In some examples, the fuel cell comprises a Y-shaped microfluidic microchannel. In other examples, the Y-shaped microfluidic microchannel further comprises a first stream and a second stream. In these examples, the first stream and the second stream are in fluid communication with each other such that they allow the components of the first and second stream to come in contact with each other at an interface and chemically react.

In some examples, the first stream comprises the silicon hydride nanocrystals and the second stream comprises water. In particular embodiments, the silicon hydride nanocrystals are dissolved in an alcohol thereby forming a silicon hydride nanocrystal/alcohol solution. In specific examples, the alcohol is isopropyl alcohol.

In some embodiments, the silicon hydride nanocrystals have a particle size between 0.5 nm and 2.5 nm. In additional embodiments, the silicon hydride nanocrystal/alcohol solution has a concentration between 0.02 mg/ml and 1.0 mg/ml. In specific embodiments, the silicon hydride nanocrystal/alcohol solution has a concentration of 0.2 mg/ml. In other embodiments, the silicon hydride nanocrystal/alcohol solution further comprises an enzyme.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
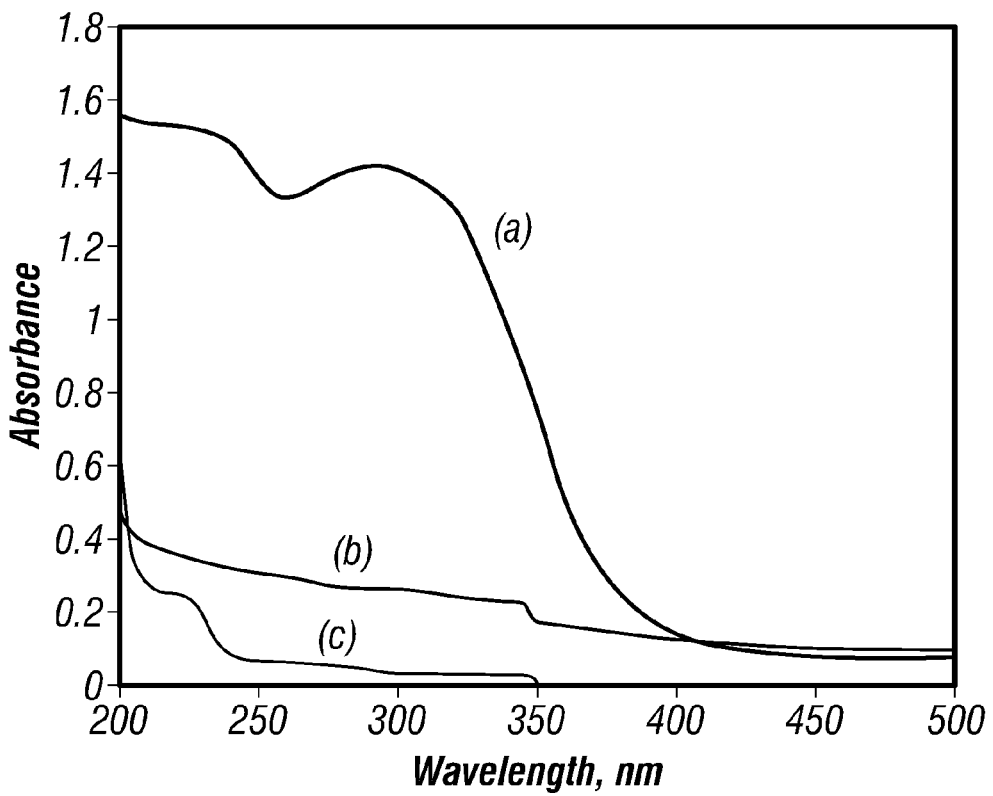
FIG. 1 shows the absorbance spectra of NCs, $FeCl_2$ and $FeCl_3$; (a) 1.1 mM $FeCl_3$ in water. Above 250 nm, the absorbance of approximately 1.5 corresponds to 3% transmission and is within the error of the machine (true transmission in this regime is ≈0%); (b) 1.1 mM $FeCl_2$ in water; and, (c) 10% NC-IPA suspension by volume in water.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

In chemistry and as described herein, the term "proton" refers to the hydrogen ion, $H^+$. Since the atomic number of hydrogen is 1, a hydrogen ion has no electrons and corresponds to a bare nucleus, consisting of a proton (and 0 neutrons for the most abundant isotope protium). The proton is a "bare charge" with only about 1/64,000th of the radius of a hydrogen atom, and so is extremely reactive chemically. The free proton, thus, has an extremely short lifetime in chemical systems such as liquids, and it reacts immediately with the electron cloud of any available molecule. In aqueous solution, it forms the hydronium ion ($H_3O^+$).

In chemistry and as described herein, the term "hydronium ion" is the cation $H_3O^+$, a type of oxonium ion produced by protonation of water. This cation is often used to represent the nature of the proton in aqueous solution, where the proton is highly solvated (bound to a solvent). The reality is far more complicated, and a proton is bound to several molecules of water, such that other descriptions such as $H_5O_2^+$, $H_7O_3^+$ and $H_9O_4^+$ are increasingly accurate descriptions of the environment of a proton in water.

The transfer of $H^+$ in an acid-base reaction is usually referred to as "proton transfer". The acid is referred to as a proton donor and the base as a proton acceptor. Likewise, biochemical terms such as proton pump and proton channel refer to the movement of hydrated H+ ions.

This disclosure provides evidence that a charge is transferred between NCs and other media. The first section discusses interactions between NCs and Fe salt ions in aqueous solutions. The second section further explores the interactions between NCs and water in aqueous-organic solvent solutions. Also, this disclosure provides a model to explain the behavior of NCs in water.

In general, the ability of silicon hydride nanocrystals (NCs) to transfer charge to and/or from other materials is useful in interacting with biological and chemical systems where charge transfer is often a very important process. In biology, many processes including photosynthesis and bacterial metabolism require charge transfer to operate. The entire field of electrochemistry is based on charge transfer between different chemical species. The ability to change the electronic structure of the NCs also increases their potential as tunable fluorescent tags and as catalysts in chemical reactions. In addition to the applications disclosed herein, controlling the energy dissipation pathways of NCs could result in a wide variety of applications.

Silicon hydride nanocrystals. In general, the silicon hydride NCs may be made using several different methods. For example, one of the methods used to produce the silicon hydride NCs is a electro-etching method where a silicon wafer is biased between two electrode at 200V and 200 mA current. This wafer is plunged in a solution containing HF, Methanol and Hydrogen peroxide. The etching can take up to 20 minutes. This method is limited by how much materials is left on the wafer and the state of oxidation. The wafer is then rinsed to remove any residual HF, and then sonicated in the solvent of choice (i.e., THF, Ethanol, Isopropanol, Toluene). The wafer is then placed in the etching bath and the etching procedure is repeated. This process produces a fully hydrogen saturated silicon nanocrystal wherein the is functionalized with —SiH; —SiH$_2$(OH); —SiH(OH)$_2$; or —Si(OH)$_3$. For example, the following chemical formula shows a representation of how the surface of the silicon nanocrystal may be functionalized.

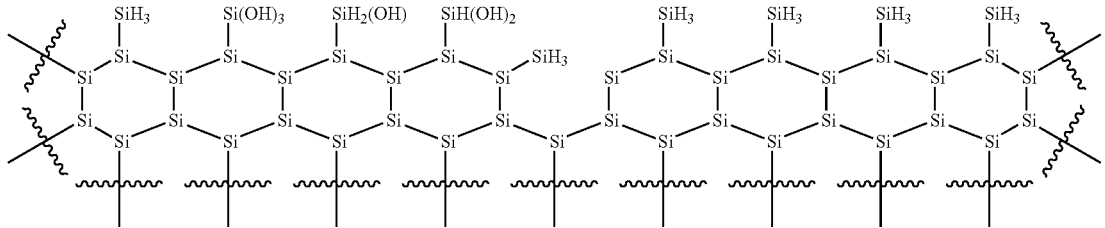

The symbol "∿", when drawn perpendicularly across a bond indicates a point of attachment of the group.

Another method used to produce the silicon hydride is the cheaper electroless method which produces an amorphous silicon hydride nanoparticle. The resulting silicon hydride nanoparticles produced by this method resemble a buckyball or a fullerene. It has the shape of any quantum dot. It is mostly spherical which minimizes its surface energy, but due to the tetrahedral coordination of silicon it has some defects that makes it not perfectly spherical. Examples of other silicon hydride nanocrystals may be found in the literature and methods to produce silicon hydride nanocrystals are within the capabilities of the skilled artisan. One such example may be found in the reference, Takahagi et al., *The formation of hydrogen passivated silicon single-crystal surfaces using ultraviolet cleaning and HF etching*, J. Appl. Phys., 64(7), 1 Oct. 1988, p. 3516-3521 which is incorporated herein by reference in its entirety.

In some embodiments, the silicon hydride nanocrystals are between 0.5 nm and 2.5 nm; between 0.5 nm and 2.25 nm; between 0.5 nm and 2.20 nm; between 0.5 nm and 2.10 nm; between 0.5 nm and 2.0 nm; between 0.5 nm and 1.9 nm; between 0.5 nm and 1.8 nm; between 0.5 nm and 1.7 nm; between 0.5 nm and 1.6 nm; between 0.5 nm and 1.5 nm; between 0.5 nm and 1.4 nm; between 0.5 nm and 1.3 nm; between 0.5 nm and 1.2 nm; between 0.5 nm and 1.1 nm; between 0.5 nm and 1.0 nm; between 0.5 nm and 0.9 nm; between 0.5 nm and 0.8 nm; between 0.5 nm and 0.7 nm; between 0.5 nm and 0.6 nm; between 0.6 nm and 1.8 nm; between 0.7 nm and 1.7 nm; between 0.8 nm and 1.6 nm; between 0.9 nm and 1.5 nm; between 1.0 nm and 1.4 nm; or between 1.1 nm and 1.3 nm in size. The broad range disclosed herein contemplates a narrow range that falls within the explicitly recited broad range, for example, the broad range between 0.5 nm and 2.5 nm contemplates a narrow range between 0.98 and 2.23 or any other range that fall between 0.5 nm and 2.5 nm.

In general, the mixed nanoparticle/alcohol solution is added to water at various concentrations. In some embodiments, the concentration of the mixed nanoparticle/alcohol solution is about 0.2 mg/ml; about 0.05 mg/ml; about 0.06 mg/ml; about 0.07 mg/ml; about 0.08 mg/ml; about 0.09 mg/ml; about 0.1 mg/ml; about 0.125 mg/ml; about 0.15 mg/ml; about 0.175 mg/ml; about 0.225 mg/ml; about 0.25 mg/ml about 0.275 mg/ml; about 0.3 mg/ml; about 0.325 mg/ml; about 0.35 mg/ml; about 0.375 mg/ml; about 0.4 mg/ml; about 0.425 mg/ml; about 0.45 mg/ml; about 0.475 mg/ml; about 0.5 mg/ml; about 0.6 mg/ml; about 0.7 mg/ml; about 0.8 mg/ml; about 0.9 mg/ml; about 1.0 mg/ml. In some embodiments, the concentration of the mixed nanoparticle/alcohol solution is between 0.02 mg/ml and 1.0 mg/ml. The broad range disclosed herein contemplates a narrow range that falls within the explicitly recited broad range, for example, the broad between 0.02 mg/ml and 1.0 mg/ml contemplates a narrow range between 0.04 mg/ml and 0.75 mg/ml or any other range that falls between 0.02 mg/ml and 1.0 mg/ml.

Figure 14:
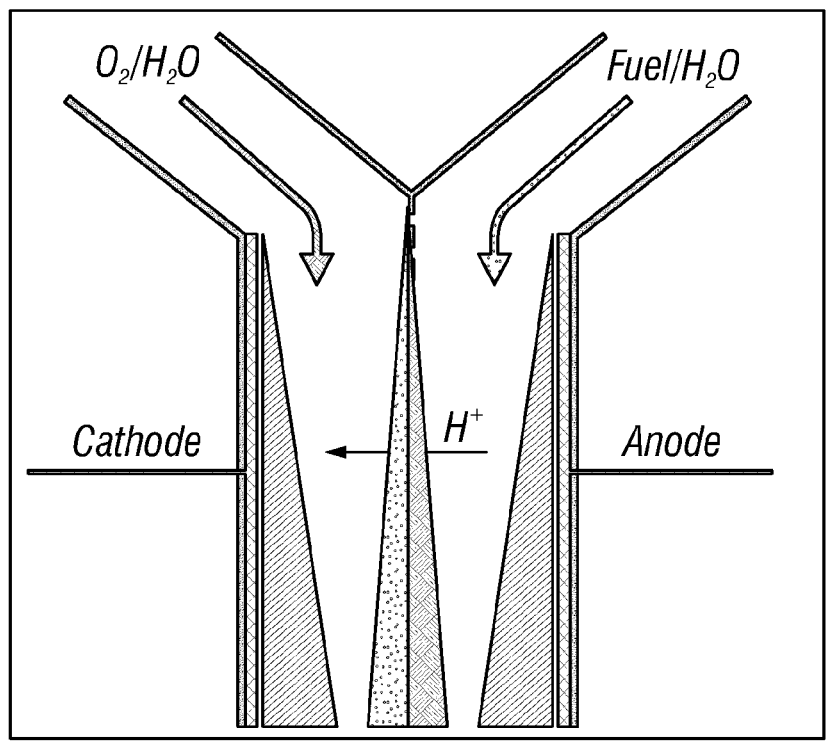
FIG. 14 shows a Y-shaped microfluidic microchannel in which two liquid streams containing pure water and a solvent (preferably isopropanol) laden with H-passivated silicon nanoparticles.
Figure 15:
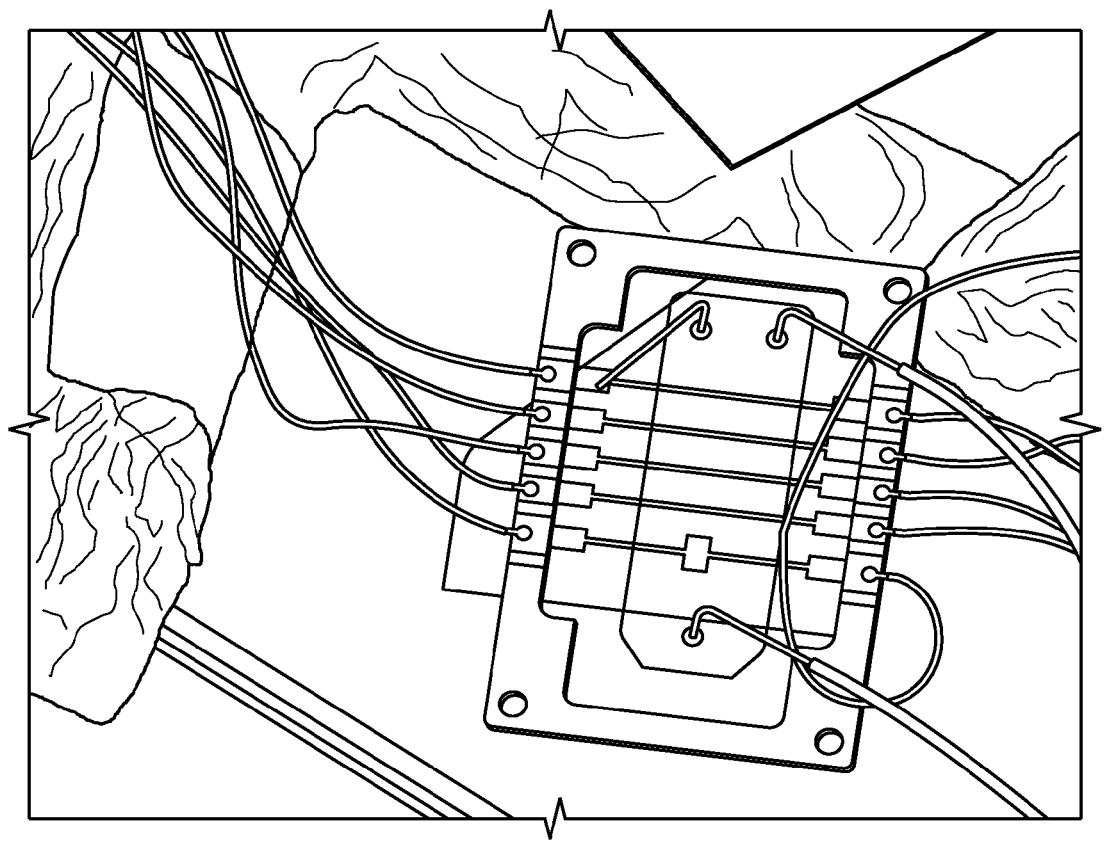
FIG. 15 shows a Y-shaped microfluidic fuel cell.
Figure 16:
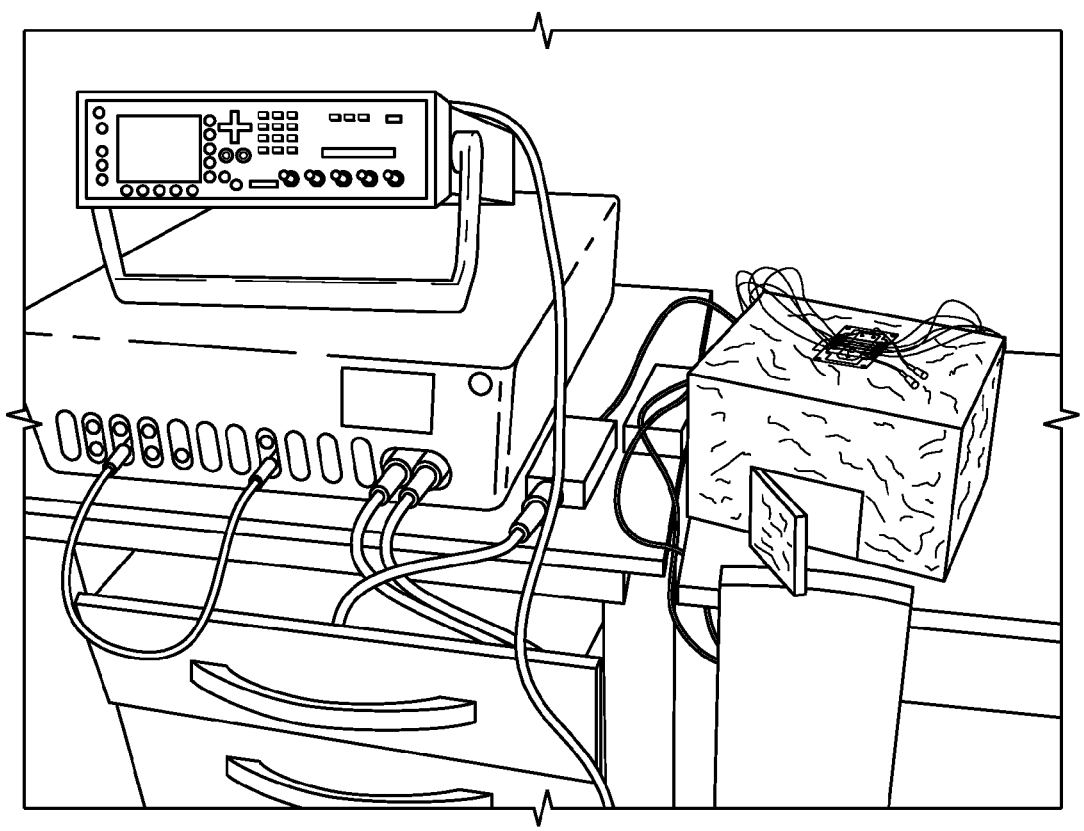
FIG. 16 shows a Y-shaped microfluidic fuel cell.
Figure 17:
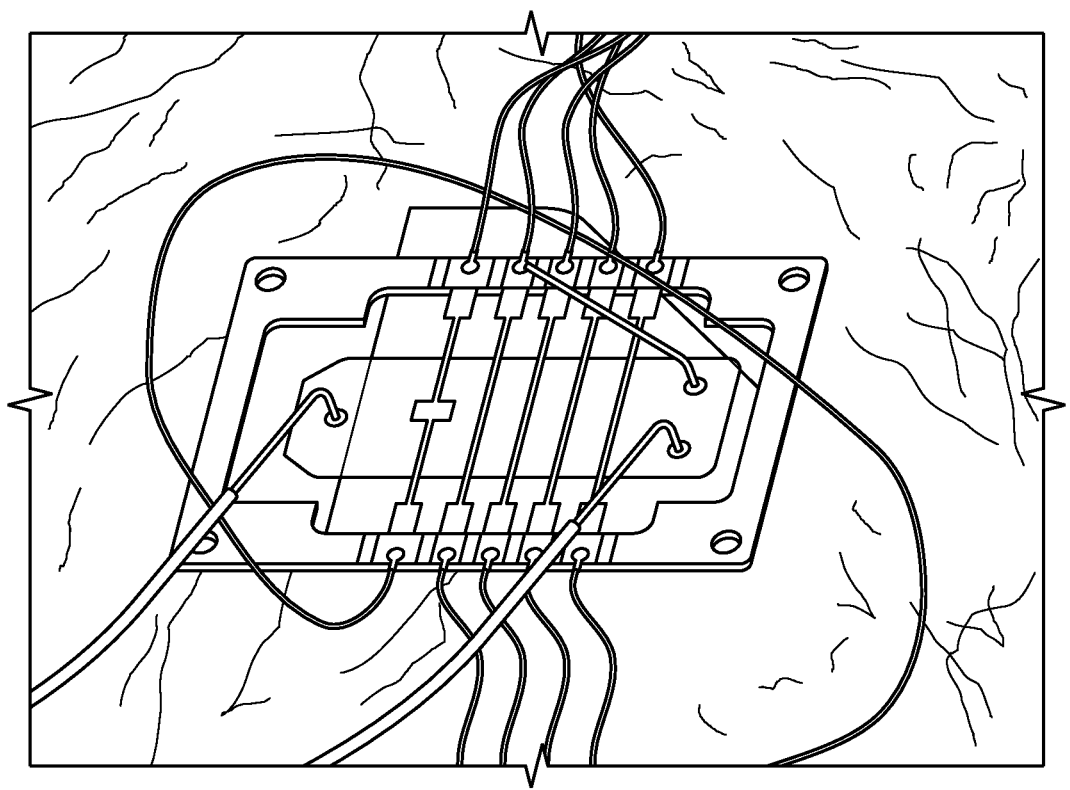
FIG. 17 shows a Y-shaped microfluidic fuel cell.
Figure 18:
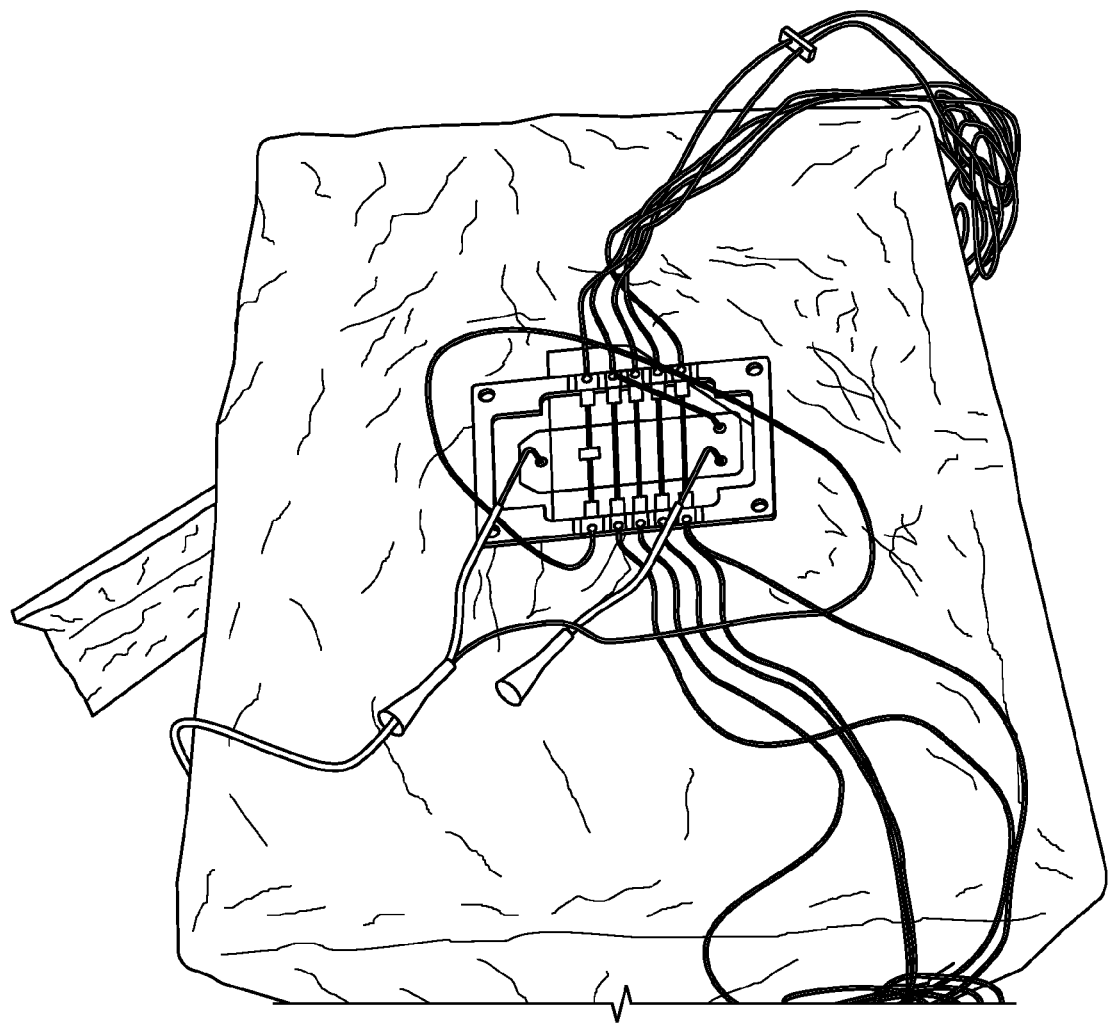
FIG. 18 shows a Y-shaped microfluidic fuel cell.

Silicon nanocrystals as catalyst for a membraneless laminar flow based microfluidic fuel cell. The present disclosure provides a novel microfluidic fuel cell that utilizes the occurrence of multi-stream laminar flow at the microscale to keep the fuel and oxidant separated yet in diffusional contact. The system is a Y-shaped microfluidic microchannel in which two liquid streams; one stream containing pure water and the other stream containing a solvent (preferably isopropanol) laden with H-passivated silicon nanoparticles (see FIG. 14). This novel fuel cell is based on the catalytic interaction that occurs between water and the isopropanol laden with silicon hydride nanoparticles. When minute quantities of isopropanol (IPA) containing a dispersion of silicon hydride nanoparticles are added to a reservoir of pure water a drop in the pH is observed. The fuel cell, as shown in FIG. 14, has been commonly used since 2004. Typically, the water is mixed with the fuel and an oxidant such as an acid (sulfuric or formic) is added.

Figure 19:
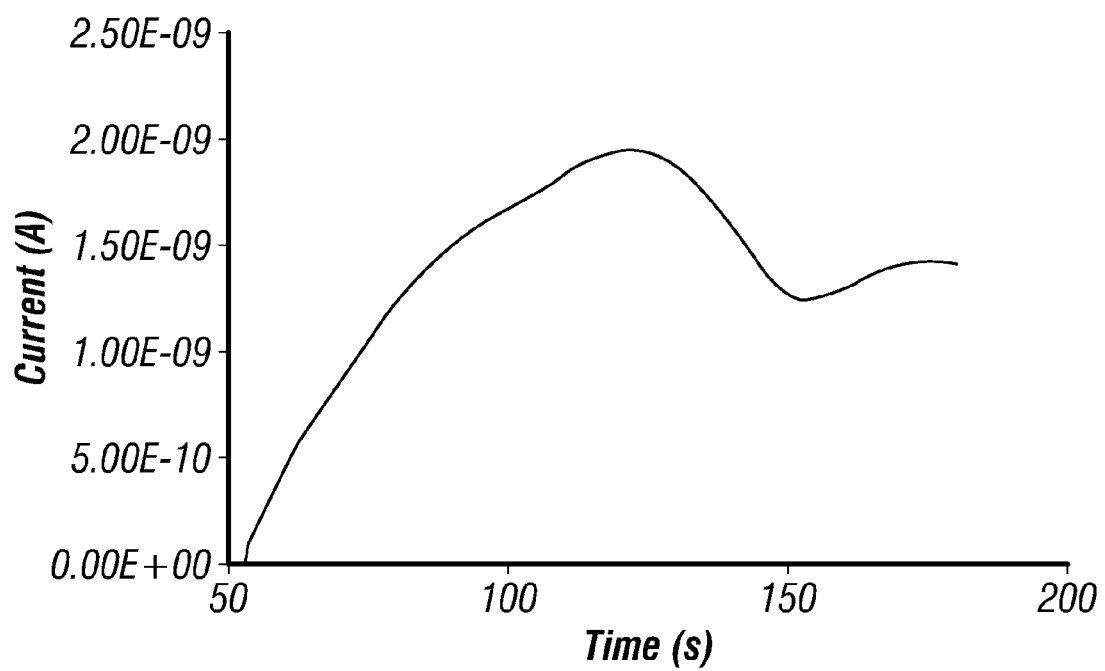
FIG. 19 shows the current registered across one of the electrodes.

The fuel cell as presented herein provides two advantages. First, the fuel cell having this Y-shaped geometry operates at room temperature. Second, the fuel cell does not use a fuel nor does it use an oxidant. Water is flown through one of the inlet and the mixture IPA and NC is flown through the other inlet. At the interface, the catalytic reaction occurs. FIG. 15, FIG. 16, FIG. 17 and FIG. 18 show examples of a Y-shaped microfluidic fuel cell. By taking advantage of the catalytic interaction that occurs between water and the isopropanol laden with silicon hydride nanoparticles, these fuel cells were able to produce a current density between 1 and 10 A/cm². FIG. 19 shows the current registered across one of the electrodes.

Interactions between Nanocrystals and Fe Ions. Charge transfer involving metal ions is the basis of all chemical batteries and many other common chemical reactions. Since many metal ions can exist with one of several different charges, they are an ideal place to start an investigation into charge transfer involving dispersed NCs. It was found during this study that many metal salts do not dissolve well in organic solvents, but are soluble in water. As provided herein, NCs can be dispersed in water by using a carrier organic solvent. Since the electrochemical behavior of NCs in water has not been thoroughly studied, the use of standard electrochemical charge detection such as half-cell potential may not be useful. Since the optical properties of the NCs are better known than the electrochemical properties, a metal salt could be chosen that changes optical characteristics depending on the charge of the ion. By measuring the optical changes in salt-NC solutions, the electronic state of each component can be inferred. Any metal chosen to interact with the NCs should be stable in water and exist in multiple oxidation states that are stable in water. Iron satisfies both conditions. Iron ions, $Fe^{3+}$ ions, have a strong absorption in the UV spectrum while the $Fe^{2+}$ ion does not (see FIG. 1). Both $Fe^{3+}$ and $Fe^{2+}$ ions are soluble in water and they are available as a chloride salt (i.e., ferric chloride $FeCl_3$ and ferrous chloride $FeCl_2$, respectively). In the absence of a strong oxidizer or reducer, the ionic forms of iron in aqueous solution are energetically favorable to the metal precipitate as seen in standard half-cell potential tables.

The absorbance spectra of iron ions vary widely between oxidation states. FIG. 1 shows the absorbance spectra of two different aqueous iron chloride salt solutions and an aqueous NC-IPA solution measured on a Varian/Cary 5 G spectrophotometer. The jumps in the spectra at 350 nm are due to the machine switching filters internally and are not features of the absorbance. The Fe(III) salt shows a clear peak in absorbance at 295 nm that does not appear in the spectrum of the Fe(III) salt. Below 250 nm, the Fe(III) salt absorbs practically all radiation thereby illuminating the F(III) salt. Whereas, the Fe(II) salt allows most of the UV light to pass as far as 200 nm. The Fe(II) salt has no sharp absorption features. The NCs show two absorbance shoulders, one at 275 nm and one at 220 nm.

Figure 2:
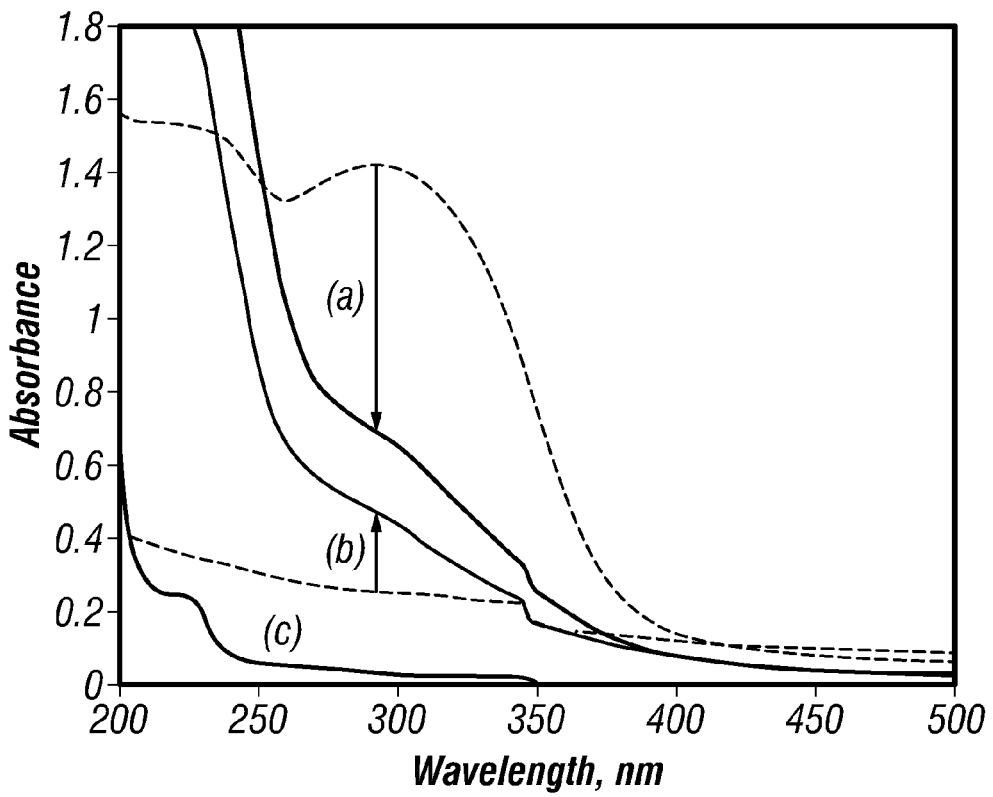
FIG. 2 shows the absorbance spectra of salts mixed with NCs (dashed lines represent salt spectra before addition of NCs (see FIG. 1)); (a) 1.1 mM $FeCl_3$ in water mixed with 10% NC-IPA suspension by volume (resultant mixture has 1.0 mM $FeCl_3$); (b) 1.1 mM $FeCl_2$ in water mixed with 10% NC-IPA suspension by volume (resultant mixture has 1.0 mM $FeCl_2$); and, (c) 10% NC-IPA suspension by volume in water.

The absorbance spectra of the salts change drastically when mixed with NCs. FIG. 2 shows the absorbance spectra of the aqueous salt-NC-IPA solutions. The spectra of the two iron salts when mixed with the NC-IPA dispersion are very similar suggesting that the oxidation states have become the same in both samples. The $Fe^{3+}$ absorbance peak at 295 nm almost disappears when the NC-IPA dispersion is added. The small residual peak at 295 nm shows that a residual amount of $Fe^{3+}$ is still present. A small amount of $Fe^{3+}$ would slightly increase the overall absorbance of UV radiation with respect to the $Fe^{2+}$ spectra. This slight increase in absorbance over the entire UV spectrum is seen in the $Fe^{3+}$-NC-IPA solution. The spectra for $Fe^{2+}$ (and $Fe^{3+}$) mixed with the NC-IPA dispersion shows an enhancement of the absorbance of the NCs under UV excitation. This suggests that the NCs form a charge complex with $Fe^{2+}$. The similar enhancement for $Fe^{3+}$ shows that after the ion is converted into $Fe^{2+}$, it similarly complexes with the NCs. The slight peak at 295 nm and the overall increased absorbance show that not all of the $Fe^{3+}$ was converted into $Fe^{2+}$. By determining the ratio of $Fe^{3+}$ to $Fe^{2+}$ in an aqueous sample mixed with an NC-IPA dispersion, it is possible to develop a method of determining NC concentration based on the number of $Fe^{3+}$ ions remaining after charge has been transferred from the NCs.

Figure 3:
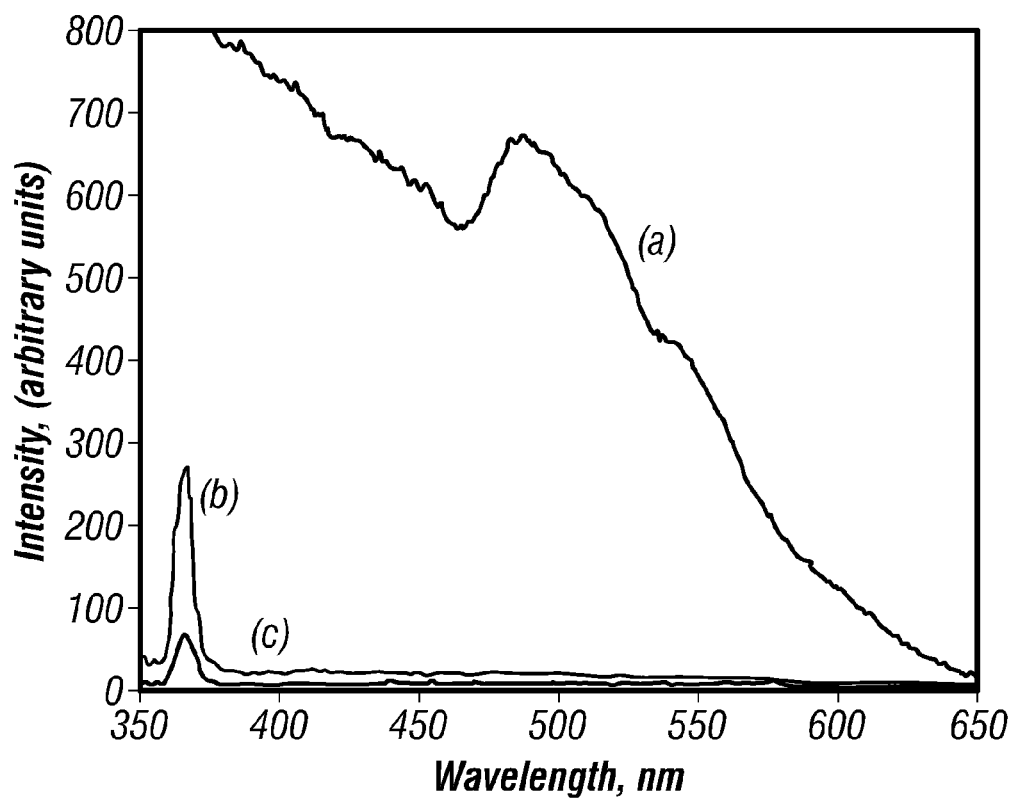
FIG. 3 shows the fluorescence spectra of NCs, $FeCl_2$ and $FeCl_3$; (a) 10% NC-IPA suspension by volume in water; (b) 1.1 mM $FeCl_2$ in water; and, (c) 1.1 mM $FeCl_3$ in water.

Since the NCs (in IPA) have a characteristic fluorescence spectrum, absorbance measurements should be compared to fluorescence measurements to ensure that the NCs have not been altered. FIG. 3 shows the fluorescence spectra of aqueous $FeCl_2$, aqueous $FeCl_3$, and the aqueous NC-IPA solution. Both salt solutions show no fluorescence under UV excitation. Both salt solutions have non-zero absorbance at the 325 nm excitation of the laser. The decrease of the 360 nm Raman peak for the $Fe^{3+}$ sample compared to the $Fe^{2+}$ sample highlights the difference in absorbance between the two ions. Unlike other NC-IPA samples, the 440 nm shoulder is less prominent, but the 485 nm peak is still clearly visible.

Figure 4:
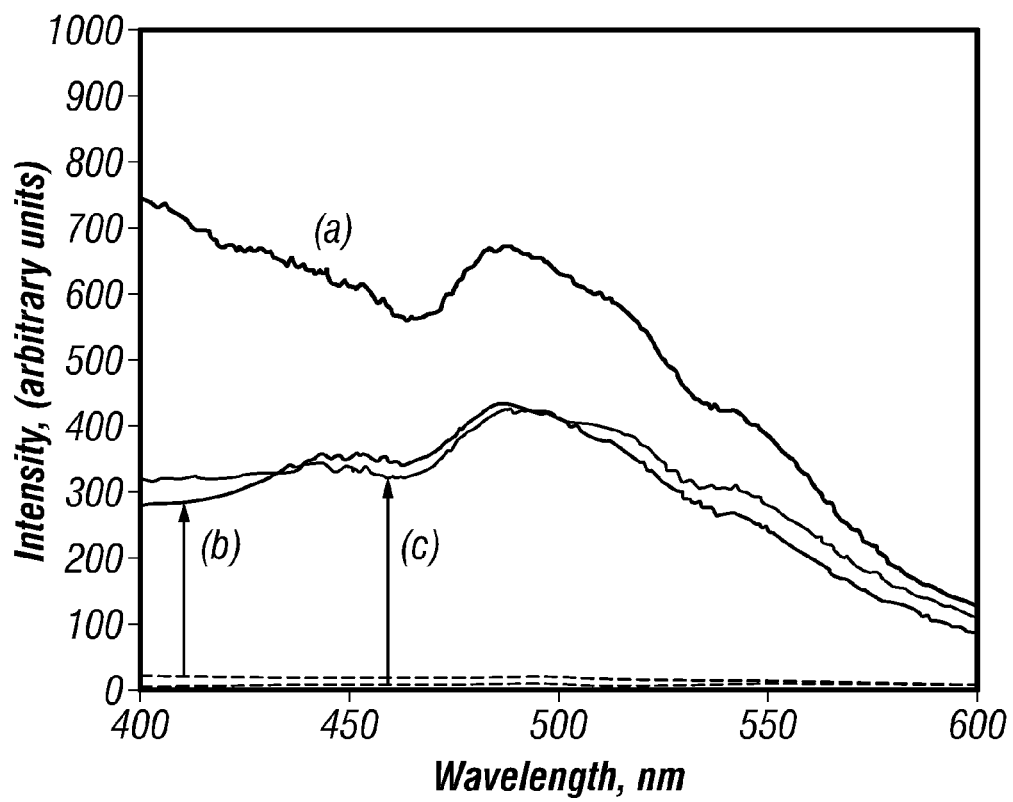
FIG. 4 shows the fluorescence spectra of salts mixed with NCs (dashed lines represent salt spectra before addition of NCs (see FIG. 3)); (a) 10% NC-IPA suspension by volume in water; (b) 1.1 mM $FeCl_2$ in water mixed with 10% NC-IPA suspension by volume (resultant mixture has 1.0 mM $FeCl_2$)); and, (c) 1.1 mM $FeCl_3$ in water mixed with 10% NC-IPA suspension by volume (resultant mixture has 1.0 mM $FeCl_3$)).

FIG. 4 shows the fluorescence of the NCs after the addition of Fe salts. The spectra of the two mixtures are nearly identical. The characteristic features of the NCs at 440 and 485 nm can be seen after the $FeCl_2$ salt has been added; the 440 nm shoulder of the aqueous NC-IPA solution becomes discernable after being mixed with $FeCl_2$. The 440 nm shoulder remains less discernable in the $FeCl_3$ sample. Although $Fe^{3+}$ absorbs most of the UV radiation, after mixing with NCs, the charge transferred from the NCs transforms the $Fe^{3+}$ into $Fe^{2+}$, and UV absorbance drops dramatically (see FIG. 2) allowing the NCs to be excited and fluoresce. The spectra of both $Fe^{2+}$ and $Fe^{3+}$ show reduced intensity of the NCs. The charged complexes formed between the Fe ions and the NCs still absorb a significant portion of the laser excitation (see FIG. 2) and reduce the possible fluorescence of the NCs.

By measuring the change in optical properties of iron salts upon mixing with NCs, charge transfer between the two species can be detected. The salts $FeCl_2$, and $FeCl_3$, easily dissolve in water forming the $Fe^{2+}$ and $Fe^{3+}$ ions respectively. The absorbance of these two salt solutions is vastly different. As a charge is transferred from the NCs to the $Fe^{3+}$ ion, the $Fe^{3+}$ ion transforms into the $Fe^{2+}$ ion and the absorbance spectra changes. This change is also seen in the fluorescence spectra of the salt-NC solutions. The Fe(III) salt-only solution absorbs the majority of the incident radiation and even reduces the prominent Raman feature at 360 nm. Once mixed with the NC-IPA solution, charge is transferred and the transmittance and NC fluorescence increase dramatically. The Fe ions also appear to form a complex with the NCs as evidenced by the change of both the absorbance spectra and fluorescence intensity.

pH of Nanocrystal-Containing Solutions. As presented herein, it is shown that hydrophobic NCs could be dispersed in water. These hydrophobic NCs dispersed in water provide evidence that NCs transfers a charge to Fe ions. If NCs can transfer charge to other chemical species, then understanding their behavior in water is the beginning to unlocking the potential electrochemical and biological uses of NCs. Measuring the pH of aqueous NC solutions is the beginning of understanding charge transfer behavior of NCs in aqueous solutions. The pH is extremely important in chemical and biological applications. The chemical equilibria of dissolved salts as well as acid-base reactions are governed by the pH of the solution. In biological systems, pH literally means the difference between life and death. In cellular biology, the pH of a solutions is carefully maintained to promote necessary chemical reactions. For example, in humans, the pH of blood is maintained between 7.35 and 7.45; outside of this range, the body undergoes acidosis (<7.35) or alkalosis (>7.45) both of which can cause weakness, nausea, and, in extreme cases, coma. Charge transfer between the NCs and water in the form of a proton exchange or a proton release would change the pH of the solution.

A Thermo Scientific glass Ag/AgCl double junction semi-micro tip pH electrode connected to an Omega microprocessor pH meter with ATC was used to measure pH in aqueous NC-IPA and NC-THF solutions. Two NC-IPA solutions and one NC-THF were used; one NC-IPA solution was a preliminary characterization of the pH of NC solutions. The second NC-IPA solution was produced to directly compare to the NC-THF solution.

The first NC-IPA solution (IPA-I) was titrated into 2 ml deionized water. The second NC-IPA solution (IPA-2) was titrated into 5 ml deionized water. Since the NC THF solution can form aggregates if too much water is added, the sample was titrated into 2.5 ml deionized water mixed with 2.5 ml THF. The solutions were mixed with a PTFE coated magnetic stir bar operated in small bursts to prevent excessive heating of the sample.

Figure 5:
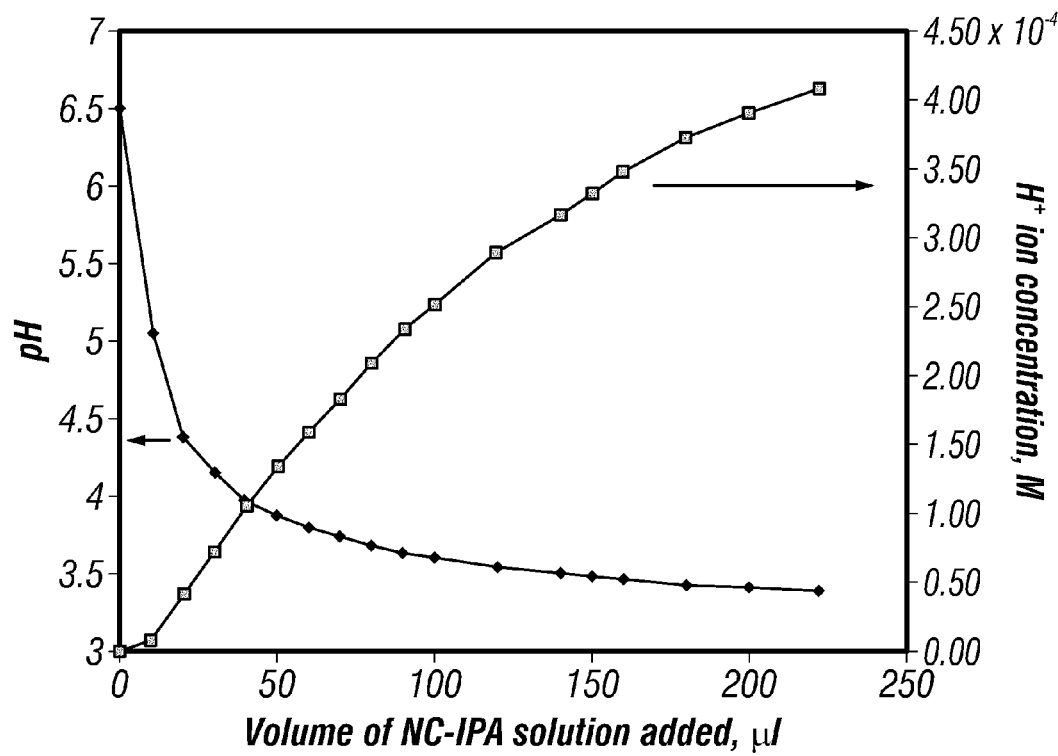
FIG. 5 shows the titration curve of IPA-1 into 2 ml water ($H^+$ concentration is given assuming the activity of $H^+$ is equivalent to concentration and pH=−log [$H^+$]).

IPA-I was titrated to 10% of solution by volume into water. The pH of the solution is shown in FIG. 5. The NC-IPA solution dramatically decreases the pH of the solution. It was observed that IPA without NCs did not measurably change the pH of water when mixed up to 10% by volume IPA. The dissociation constant ($pK_a$) of IPA is approximately 16.5 which means that the H of the hydroxyl group of the IPA is tightly associated with the IPA molecule. At 10% of solution by volume, IPA molecules produce only about 0.02 times as many $H^+$ ions as the self-ionization of water. Therefore, NCs play the critical role in changing the pH of solution. Near 0% NC-IPA by volume added, the self-ionization of water dominates the pH of the solution.

Figure 6:
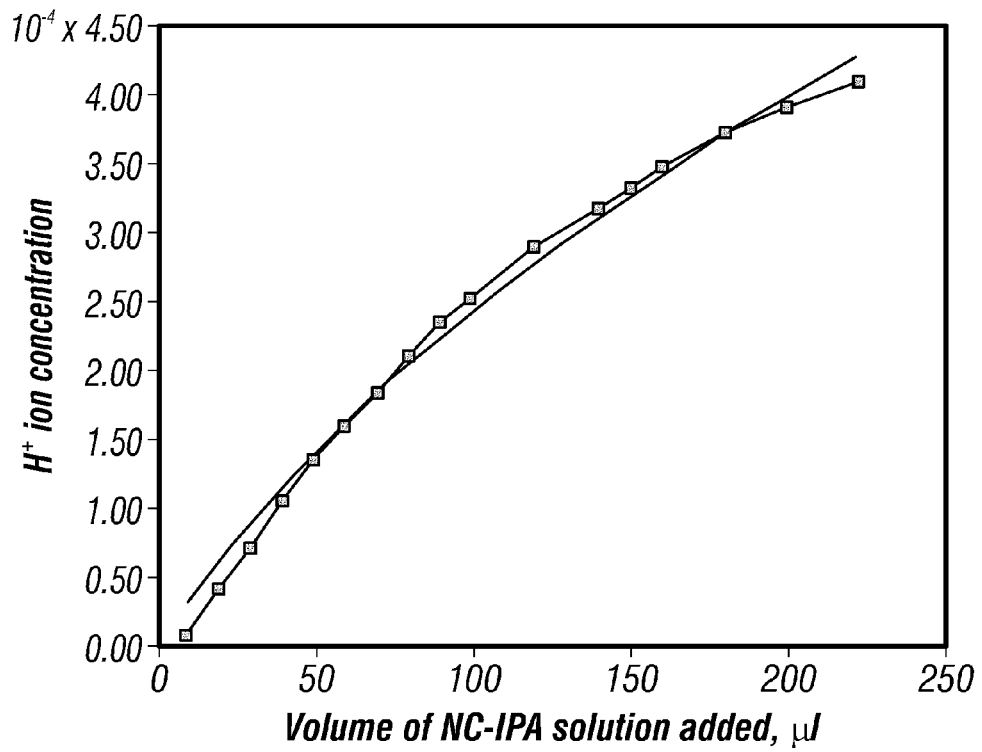
FIG. 6 shows the modeling of IPA-1 as a weak acid ($pK_a$ for the model is 3.12 with error range (between 3.03 and 3.24) and [stock] for the model is 6.67 mM with error range (3.54, 10.8 mM)).

The pH behavior of the NCs seen in FIG. 5 looks similar to that of a weak monoprotic acid when added to water. Modeling the NCs as a weak acid, the equilibrium equation is:

$$Ka = \frac{[NC^-][H^+]}{[NC]} \quad (1)$$

Where $K_a$ is the acid dissociation constant, [$NC^-$] is the equilibrium concentration of dissociated NCs and [NC] is the equilibrium concentration of undissociated NCs. $H^+$ ions in excess of those produced by the self-dissociation of water represent the charge transferred to the water via protonation of the water. Manipulation of equation (1) yields:

$$[H^-] = \frac{K_a}{2}\left(\sqrt{1 + \frac{4[stack]}{k_a}\frac{V_{add}}{V_{add}+V_{init}}} - 1\right) \quad (2)$$

Where [stack] is the concentration of NCs in the titrating NC-IPA dispersion, $V_{add}$ is the volume of NC-IPA solution added, and $V_{init}$ is the volume before titration (2 ml for the titration of FIG. 5). This model only holds if the $H^+$ ion concentration is significantly higher than the $H^+$ ion concentration of self-ionization of water ([$H^+$]=$10^{-7}$ M). Therefore, the pH at 0 μl NC-containing solution added must not be included in application of the model. FIG. 6 shows the titration represented in FIG. 5 fit to the model in Equation (1). The $pK_a$ measured for NCs is 3.12 (+0.09, −0.12) with a measure NC stock concentration of 6.67 mM (+4.13 mM, −3.13 mM).

Figure 7:
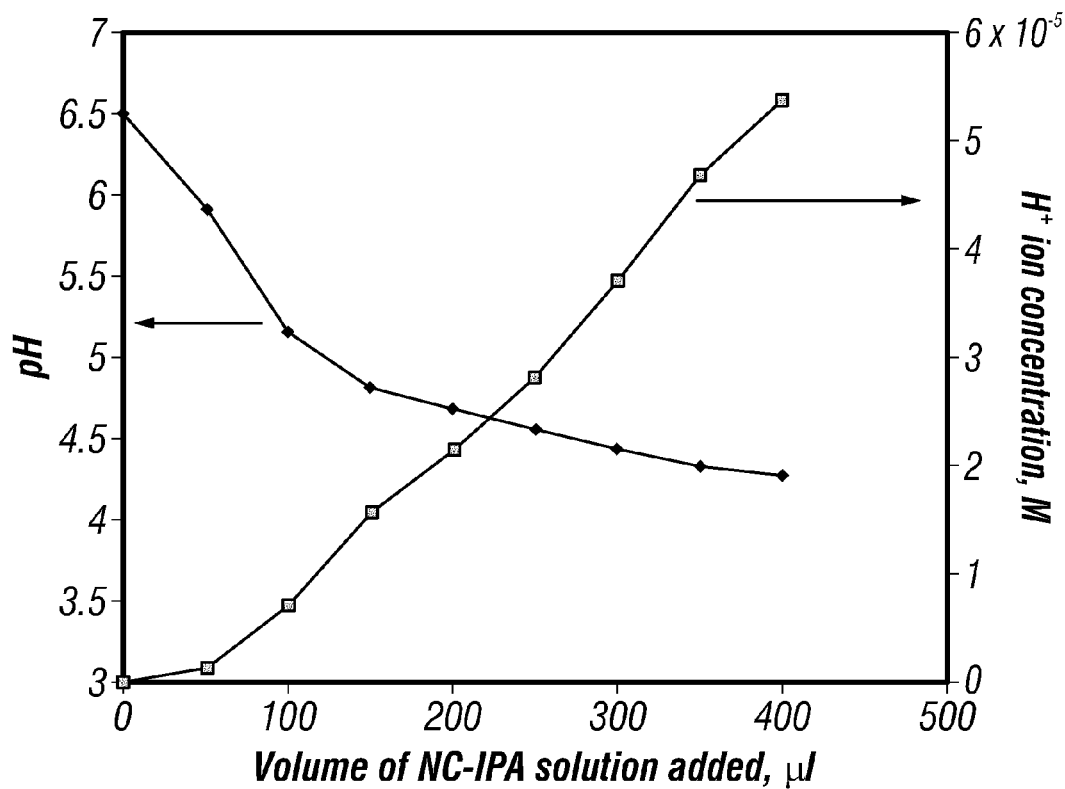
FIG. 7 shows the titration curve of the first NC-IPA solution into 5 ml water ($H^+$ concentration is given assuming the activity of $H^+$ is equivalent to concentration and pH=−log [$H^+$]).

IPA-2 differs from IPA-1 in that wafers were soaked in deionized water for 5 min after rinsing off etchant and before sonicating to ensure there was no HF remaining that could cause the pH drop seen in FIG. 5. The titration of IPA-2 into 5 ml of water is shown in FIG. 7. Unlike the previous titration, the pH did not drop below 4 making the $H^+$ ion concentration an order of magnitude lower that the first NC-IPA dispersion. The model described by Equation (1) cannot be meaningfully applied to IPA-2 due to the data presented in FIG. 7 following a linear (as opposed to square root) trend. In some examples, the nanoparticles are constantly protected by an alcohol shell. It is hypothesized that water and alcohol do not mix at the molecular level and it is believed that the particles are protected by this property. Once the particles are dispersed in a solvent, the particles retain their luminescent activity (fluorescence). After dispersing the particles in a solvent, the particles are added drop-by-drop to the water. This addition does not affect the state of the particles. This one of the contributing factors as to why the reaction between the nanoparticle/alcohol solution and the water produces an electrical current.

Figure 8:
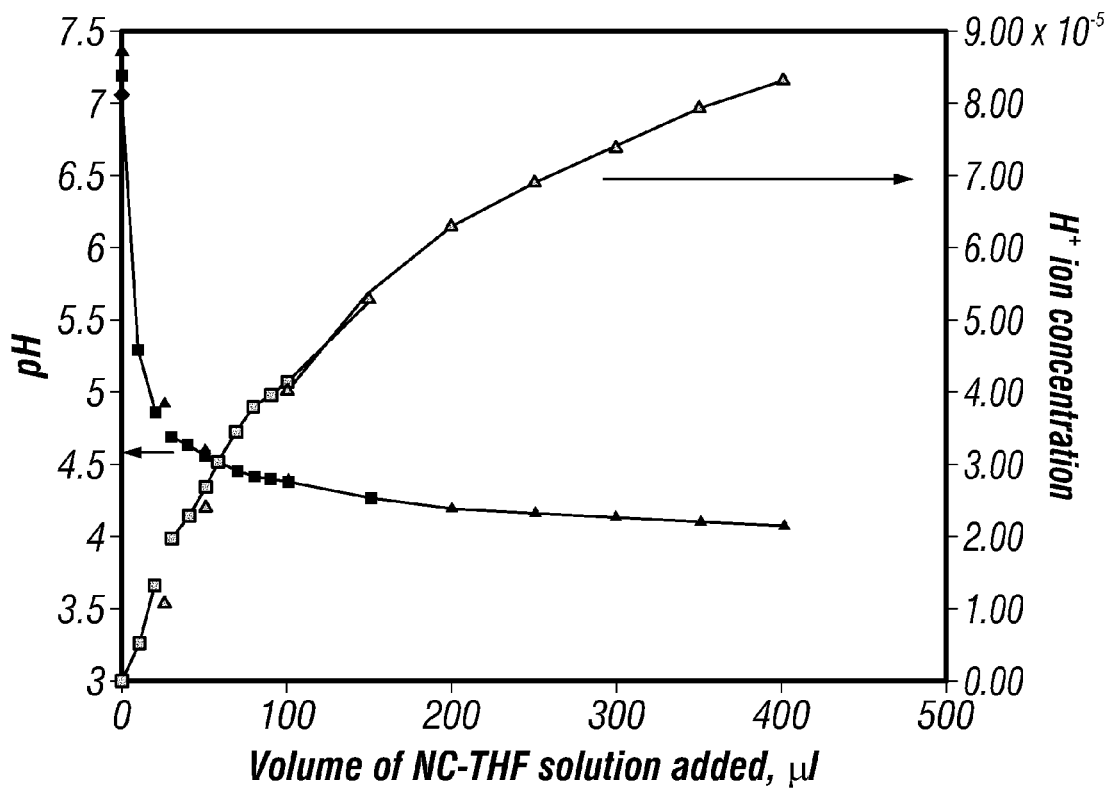
FIG. 8 shows the titration curve of the NC-THF solution into 2.5 ml water and 2.5 ml THF ($H^+$ concentration is given assuming the activity of $H^+$ is equivalent to concentration and pH=−log [$H^+$]; and, triangles, diamonds, and squares represent the three individual titrations).

The NC-THF solution pH measurements are shown in FIG. 8. Like IPA-2, the wafers for the NC-THF dispersion were soaked for 5 min in deionized water prior to sonication to remove any last traces of THF. Three individual titrations were performed to different end points to increase the range of pH data. For all three, the NC-THF dispersion was added to 2.5 ml water mixed with 2.5 ml THF. The pH of the NC-THF solution, like IPA-1, shows a similarity to that of a weak acid. The pH of THF mixed with water was measured prior to titration to ensure that the solvent was not contributing to the drop in pH. The pH of the THF-water mixture actually increased slightly from 6.82 to 7.74 by adding starting from a water only solution an 50% by volume THF.

Figure 9:
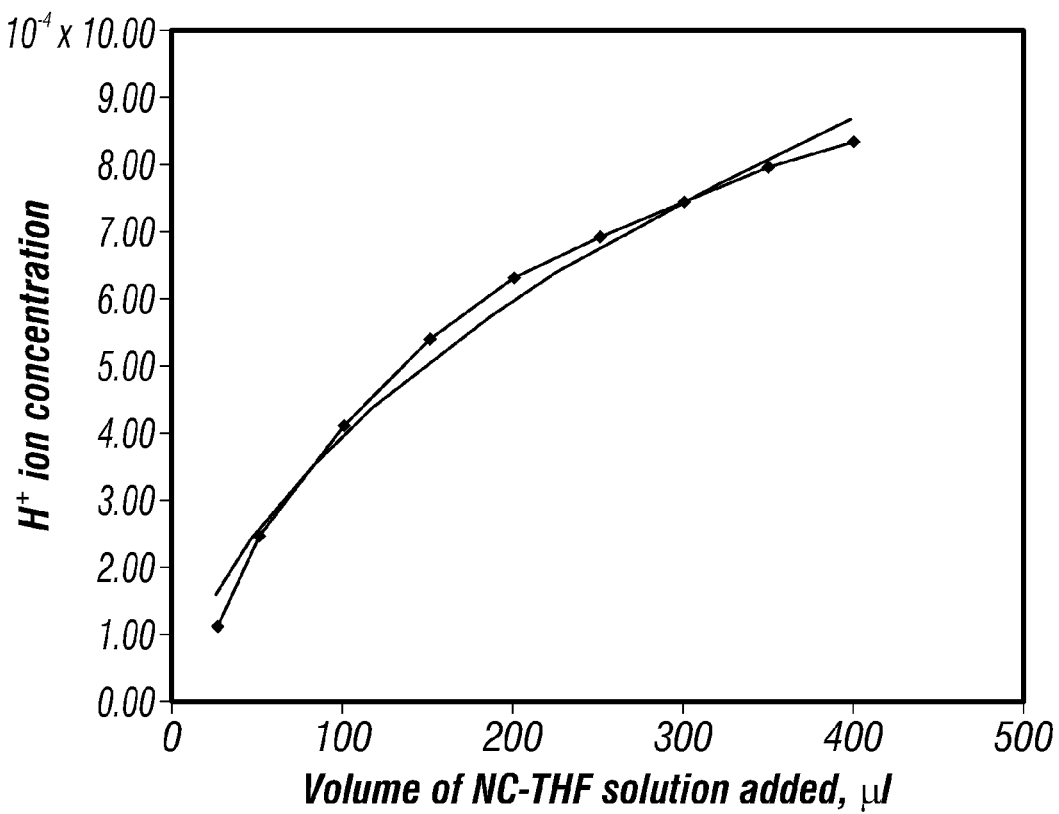
FIG. 9 shows the modeling based upon Equation (1) for the NC-THF solution as a weak acid, the $pK_a$ for the model is 4.70 (+0.63, −0.19), [stock] for the model is 0.24 mM (+7.16 mM, −3.99 mM).
Figure 10:
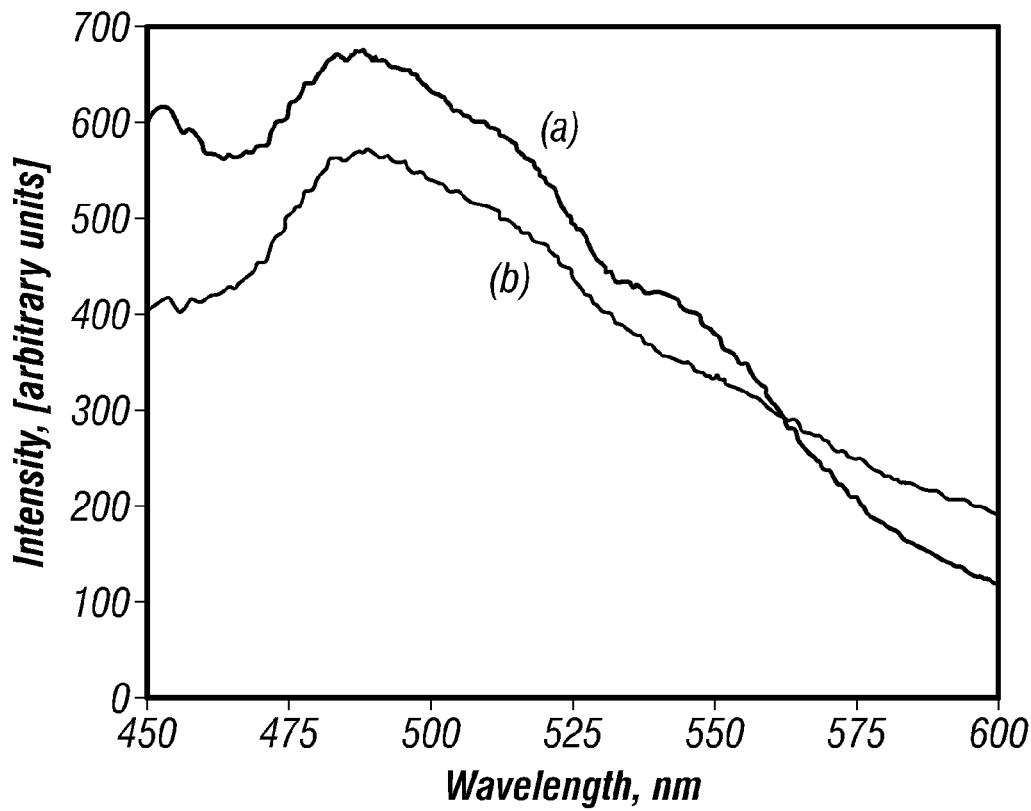
FIG. 10 shows the fluorescent spectra of (a) IPA-1 and (b) the NC-THF solution both diluted to 10% NC solution by volume.

The application of Equation (1) to the $H^+$ ion concentration of the aqueous NC-THF solution is shown in FIG. 9. The $pK_a$ of the NC-THF solution based on the model of Equation (1) is 4.70 (+0.63, −0.19) with an NC stock concentration of 4.24 mM (+7.16 mM, −3.99 mM). The $pK_a$ measured for the NC-THF solution is significantly higher than for IPA-1. The IPA-2 titration showed that a water soaking bath had affected the acidic nature of the NCs. Since the NC-THF dispersion also utilized the 5 minute water soak in processing the dispersion, it is likely that the difference in $pK_a$ is due to this water treatment. The concentration of NCs in the stock solution was calculated to be very similar between IPA-1 and the NC-THF dispersion at 6.67 mM and 4.24 mM respectively. The fluorescent intensity is also similar between the two samples as shown in FIG. 10. The similarities of the fluorescence and the calculated stock concentration between the IPA-1 and NC-THF dispersion support the model of NCs acting as a weak acid when dispersed in aqueous solutions.

The decrease in pH shown in the three samples above shows that when the NCs are stably mixed with water via a carrier organic solvent, the NCs transfer charge to the water in the form of $H^+$ ions. More validity can be given to the weak acid model by performing titrations of stable aqueous solutions of NCs with a strong base. If the NCs transfer protons to water like an acid, then the hydroxyl ions released by the base will neutralize the $H^+$ ions, and the pH will rise. Titrations involving acids and bases also have buffer regions before and after the neutralization point where the pH changes very slowly with concentration of titrant. The weak acid model predicts that aqueous NC solutions should have the characteristic acid-base "S" curve when titrated with a strong base.

Aqueous 0.02 M NaOH solution was prepared as the titrant for all titrations. The pH was measured with a Thermo Scientific glass Ag/AgCl double junction semi-micro tip pH electrode connected to an Omega microprocessor pH meter with ATe. Solutions were stirred by a PTFE coated magnetic stir bar operated in bursts to prevent excessive heating of the sample.

Figure 11:
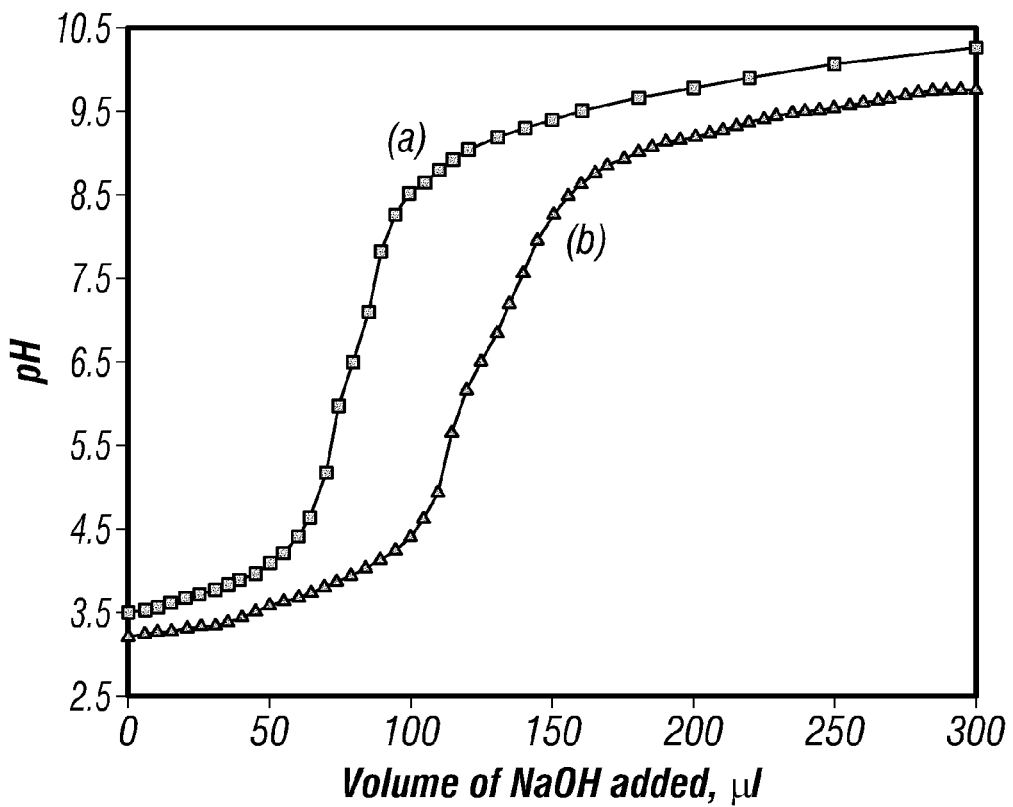
FIG. 11 shows NaOH (0.02 M) titrations of IPA-1; (a) 0.15 ml IPA-1 mixed with 5 ml deionized water; and, (b) 0.25 ml IPA-1 mixed with 5 ml deionized water.

The titrations of IPA-1 are shown in FIG. 11. Both 0.15 ml and 0.25 ml of IPA-1 mixed with 5 ml water (2.9% IPA-I by volume and 4.8% IPA-I by volume respectively) show the S-curve characteristic of acid-base titrations. The equivalence point (point of inflection) indicates the point at which all of the acid has been neutralized, i.e. at this point, the concentration of a strong base equals the concentration of the acid. Exploiting this fact, the concentration of NCs in IPA-1 is calculated to be 10.5 mM and 9.3 mM for the titrations with 0.15 ml and 0.25 ml IPA-1 added, respectively. These values are very close to the value measured by the weak acid model of 6.67 mM (+4.13 mM, −3.13 mM). Using the Henderson-Hasselbalch equation:

$$pH = pK_a + \log\left(\frac{[\text{conjugate base}]}{[\text{acid}]}\right) \quad (3)$$

The $pK_a$ of an acid can be determined. Since the equivalence point is the point at which all of the acid has been converted into its conjugate base, at half the volume of added titrant of the equivalence point, the concentrations of the acid and conjugate base are equal and $pH = pK_a$. Using this method, the $pK_a$ is calculated to be 3.91 and 3.76 for the titrations with 0.15 ml and 0.25 ml IPA-1 added, respectively. The $pK_a$ measured by this method is slightly higher than the $pK_a$ calculated from Equation (1) which was 3.12 (+0.12, −0.09).

Figure 12:
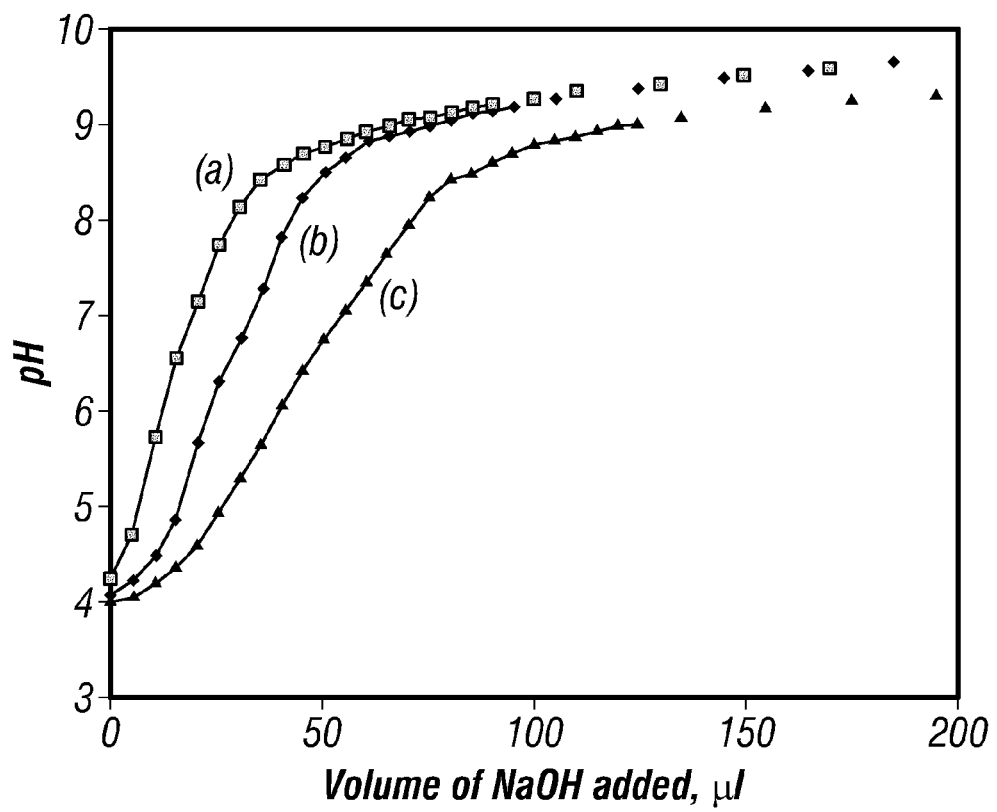
FIG. 12 shows NaOH (0.02 M) titrations of IPA-2; (a) 0.4 ml IPA-2 mixed with 5 ml deionized water; (b) 0.556 ml IPA-2 mixed with 5 ml deionized water; and, (c) 1 ml IPA-2 mixed with 5 ml deionized water.

Titrations performed with IPA-2 are shown in FIG. 12. IPA-2 titrations do not have the clean S-curve structure found in IPA-1 titrations. As was discussed previously, 1PA-2 wafers were soaked in a deionized water bath for 5 minutes prior to sonication. Although IPA-2 does decrease the pH of water, the effect is limited. The pH for titrations in involving IPA-2 did not start below 4.0 even when 16% of the solution by volume was comprised of IPA-2. No buffer region is found prior to the equivalence point indicating that very few of the NCs were participating in charge transfer via protonation of the water. Finding the concentration of the NCs in IPA-2 using the equivalence point as described above gives a concentration of 0.90 mM, 1.07 mM, and 0.99 mM for 0.4 ml, 0.556 ml, and 1.0 ml IPA-2 added, respectively. These values are 10 times lower than the concentration of IPA-I measured using the equivalence point. Without a buffer region prior to the equivalence point, a $pK_a$ value cannot be obtained from the titration curve.

Figure 13:
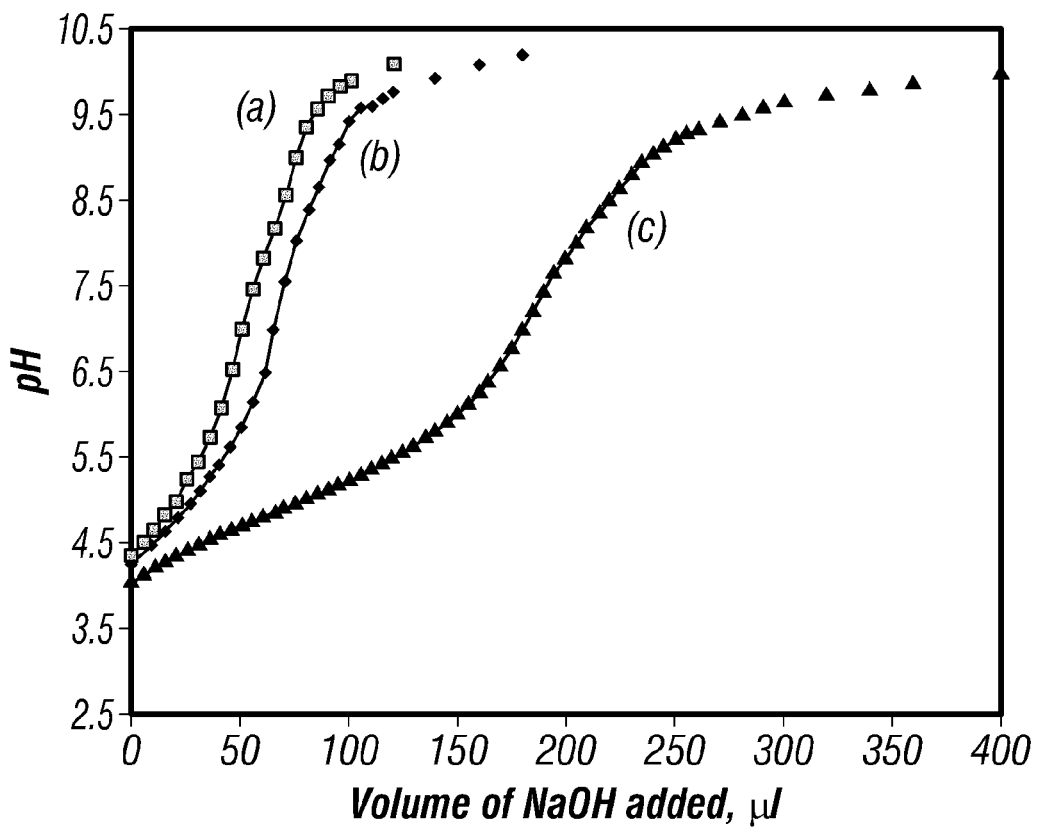
FIG. 13 shows NaOH (0.02 M) titrations of the NC-THF dispersion; (a) 0.1 ml NC-THF solution mixed with 2.5 ml deionized water and 2.5 ml THF; (b) 0.15 ml NC-THF solution mixed with 2.5 ml deionized water and 2.5 ml THF; and, (c) 0.4 ml NC-THF solution mixed with 2.5 ml deionized water and 2.5 ml THF.

The titration curves of the NC-THF solution are shown in FIG. 13. The 0.1 ml and 0.15 ml NC-THF mixed with 2.5 ml water and 2.5 ml THF look similar to the titrations of IPA-2 in FIG. 12. The NC-THF wafers were soaked for 5 minutes in deionized water prior to sonication like the IPA-2 wafers. No buffer region can be detected for these two concentrations. The concentration of NCs using the equivalence point is 10.9 mM and 9.21 mM for 0.1 ml and 0.15 ml NC-THF, respectively. Unlike the IPA-2 titrations, these values are comparable to IPA-1 equivalence point concentrations as well as the NC-THF Equation (1) concentrations of 4.24 mM (+7.16 mM, −3.99 mM). The titration of the 0.4 ml NC-THF solution reveals a typical acid-base titration S-curve. Using the equivalence point, the concentration of the NC-THF dispersion is 8.94 mM, similar to the other NC-THF titration curves and the calculation from Equation (1). At higher concentrations of the NCs in the titrand, a significant buffer region is seen allowing a $pK_a$ to be calculated using Equation (2). The $pK_a$ for the titration curve is 5.11. This $pK_a$ is within the error region of the $pK_a$ found from Equation (1) of 4.70 (+0.63, −0.19).

The NCs can transfer charge to other chemical species as seen. When the NCs are mixed with an iron salt such as $FeCl_3$ the $Fe^{3+}$ ions are converted to $Fe^{2+}$ ions and form a complex with the NCs as seen in absorbance and fluorescence measurements. When dispersed in water, the NCs transfer charge to the water in the form of protonation as seen by pH titrations. Charge was transferred to the water for NCs in two separate classes of organic solvents, an alcohol (IPA) and an ether (THF). Neither solvent releases $H^+$ ions spontaneously. THF even increases the pH when mixed with water. Therefore, dispersed NCs are responsible for the charge transfer evidenced in NCs dispersed in water by using a carrier organic solvent.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A method for generating an electrical current comprising the step of:
    reacting silicon hydride nanocrystals having a particle size between 0.5 nm and 2.5 nm dispersed in an organic solvent with water, wherein the step of reacting silicon hydride nanocrystals with water takes place in a fuel cell comprising a Y-shaped microfluidic microchannel,
    wherein the Y-shaped microfluidic microchannel comprises: a first stream and a second stream, wherein the first stream and the second stream are in fluid communication with each other,
    wherein the first stream comprises the silicon hydride nanocrystals and the second stream comprises water,
    wherein the silicon hydride nanocrystals are dissolved in isopropyl alcohol thereby forming a silicon hydride nanocrystal/alcohol solution and the silicon hydride nanocrystal/alcohol solution has a concentration between 0.02 mg/ml and 1.0 mg/ml.

2. The method of claim 1, wherein the silicon hydride nanocrystal/alcohol solution has a concentration of 0.2 mg/ml.

3. A fuel cell comprising:
    a Y-shaped microfluidic microchannel comprising a first stream and a second stream, wherein the first stream and the second stream are in fluid communication with each other:
    silicon hydride nanocrystals having a particle size between 0.5 nm and 2.5 nm dispersed in an organic solvent; and
    water, wherein the first stream comprises the silicon hydride nanocrystals and the second stream comprises water, wherein the silicon hydride nanocrystals are dissolved in isopropyl alcohol thereby forming a silicon hydride nanocrystal/alcohol solution and the silicon hydride nanocrystals/alcohol solution has a concentration between 0.02 mg/ml and 1.0 mg/ml.

4. The fuel cell of claim 3, wherein the silicon hydride nanocrystal/alcohol solution has a concentration of 0.2 mg/ml.

5. The fuel cell of claim 4, wherein the silicon hydride nanocrystal/alcohol solution further comprises an enzyme.

* * * * *